United States Patent [19]

Warren, Jr. et al.

[11] Patent Number: 5,342,159
[45] Date of Patent: Aug. 30, 1994

[54] ACCESS AND SUPPORT APPARATUS FOR LOADING AND UNLOADING GONDOLA CARS

[76] Inventors: Bobby G. Warren, Jr., Rte. 1 Box 337, Sibley, La. 71073; James D. Davis, Rte. 2, Box 535, Minden, La. 71055

[21] Appl. No.: 188,392

[22] Filed: Sep. 7, 1993

Related U.S. Application Data

[62] Division of Ser. No. 963,604, Nov. 30, 1992, which is a division of Ser. No. 678,229, Apr. 1, 1991, Pat. No. 5,183,369.

[51] Int. Cl.$^5$ .............................................. B65G 67/02
[52] U.S. Cl. .................................. 414/339; 108/55.3; 414/394
[58] Field of Search .............................. 414/339–342, 414/345, 394, 491, 537; 108/55.3, 64; 104/137; 14/2.4

[56] References Cited

U.S. PATENT DOCUMENTS

| | | | |
|---|---|---|---|
| 1,933,811 | 11/1933 | Kassakowski | 414/537 X |
| 2,906,212 | 9/1959 | Hayes | 414/339 X |
| 3,881,612 | 5/1975 | Wells | 414/394 |
| 4,128,180 | 12/1978 | Mellious | 414/339 |
| 4,175,902 | 11/1979 | Herzog et al. | 414/339 |
| 4,830,562 | 5/1989 | Frederking | 414/339 |
| 5,066,188 | 11/1991 | Bush | 414/339 |
| 5,174,211 | 12/1992 | Snead | 414/339 X |

Primary Examiner—Michael S. Huppert
Assistant Examiner—James W. Keenan
Attorney, Agent, or Firm—John M. Harrison

[57] ABSTRACT

An access and support apparatus for loading and unloading gondola railroad cars using a crane-type crawler, which system includes a trailer-mounted ramp for disposition in close proximity to a gondola railroad car and multiple pallets adapted for spanning the top width of the gondola railroad car and supporting tile crane-type crawler. The crane-type crawler is unloaded from the trailer and traverses the ramp to the pallets. In a first preferred embodiment the pallets are characterized by fixed pallets having no adjustable feature. In a second preferred embodiment the pallets are adjustable to accommodate a characteristic bulge in the center of the gondola railroad cars for a higher degree of safety. The pallets are typically sequentially moved from the rear to the front of the crane-type crawler as the crawler loads or unloads tile gondola railroad cars and traverses the length of the cars.

4 Claims, 3 Drawing Sheets

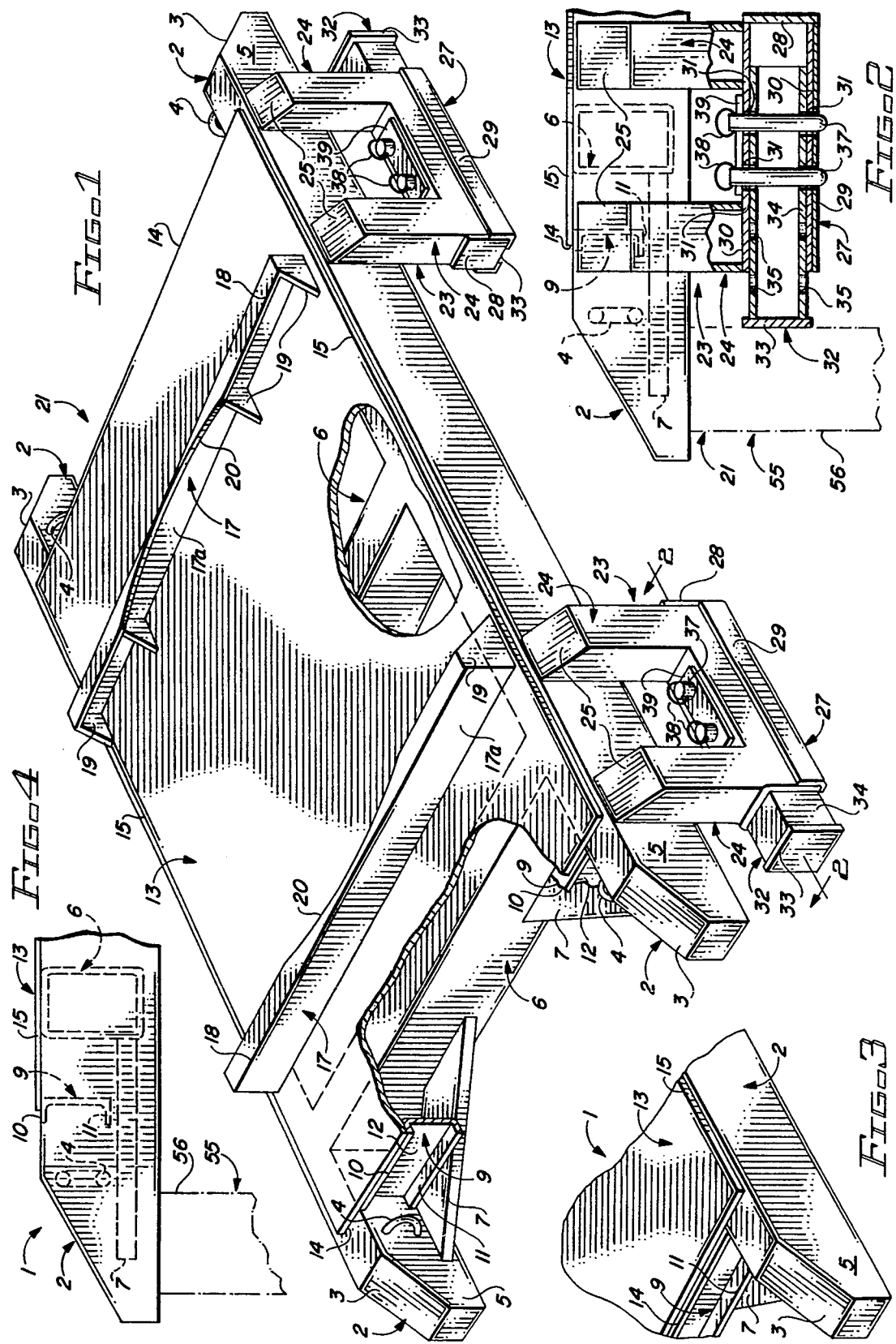

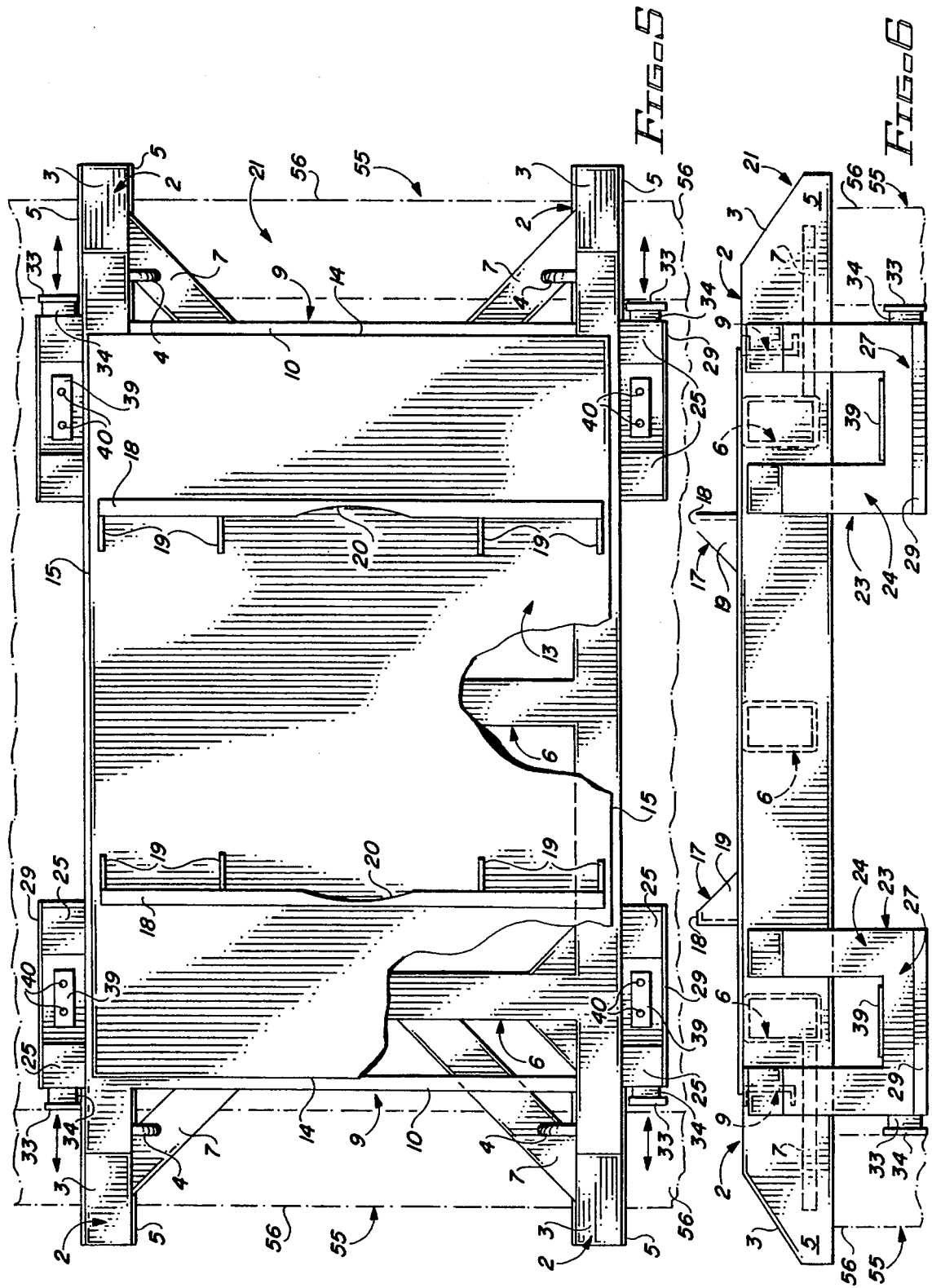

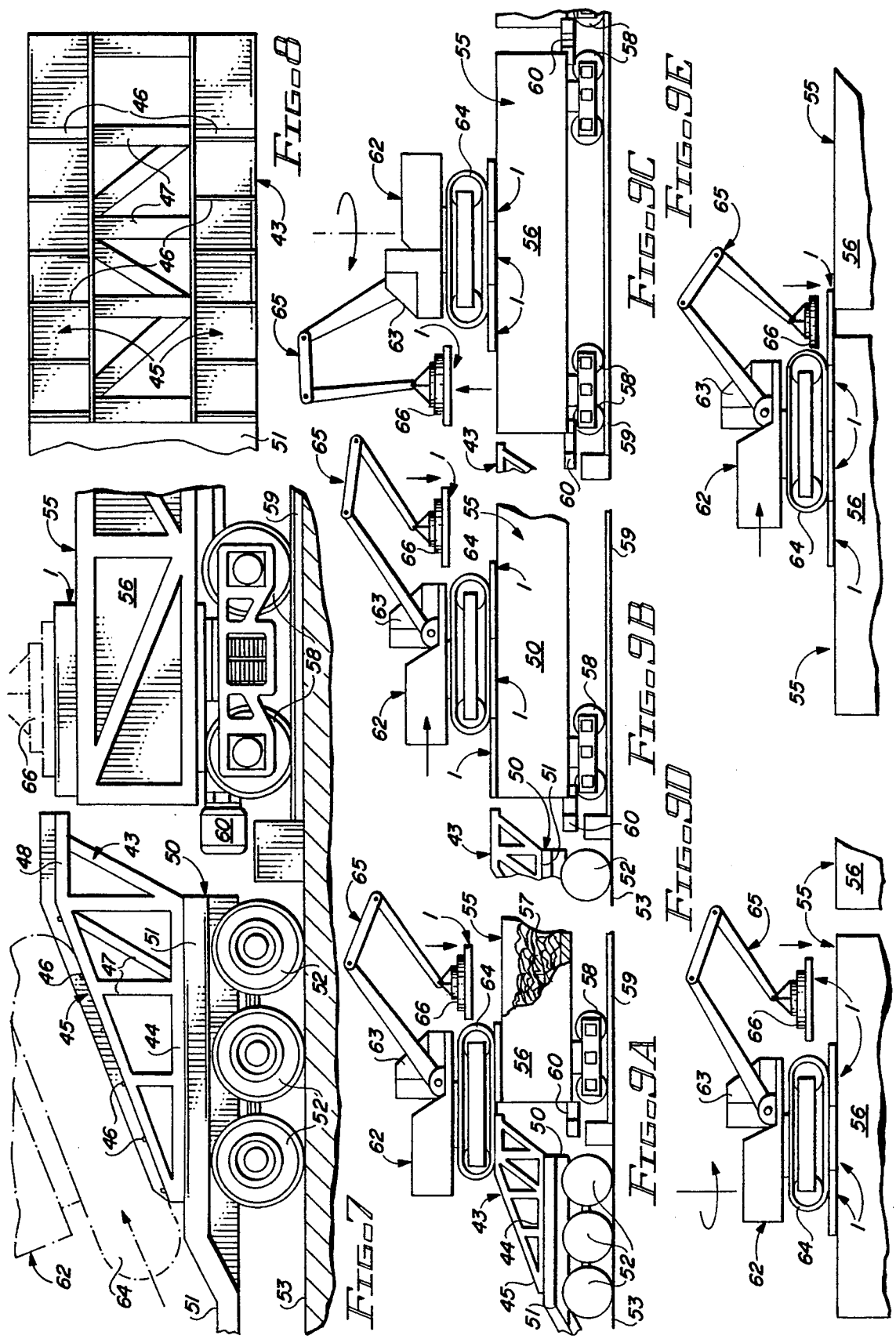

ACCESS AND SUPPORT APPARATUS FOR LOADING AND UNLOADING GONDOLA CARS

This is a divisional of copending application Ser. No. 07/963,604 filed on Nov. 30, 1992 which is a division of Ser. No. 07/678,229, filed Apr. 1, 1991 now U.S. Pat. No. 5,183,369.

BACKGROUND OF THE INVENTION

1. Field of the Invention

This invention relates to the loading and unloading of gondola railroad cars and more particularly, to an access and support apparatus for loading and unloading gondola railroad cars in a quick and efficient manner using a crane-type crawler. In a preferred embodiment the access and support apparatus of this invention is characterized by a trailer-mounted ramp adapted for manuevering in close proximity to the gondola railroad cars, and multiple, fixed or adjustable pallets adapted for spanning the top width of the gondola railroad cars and supporting the crane-type crawler. In a typical application, a flat bed trailer is backed to position the trailer-mounted ramp at the end of an open-top gondola railroad car above the coupler and the crane-type crawler is used to lift several pallets on top of the gondola railroad car. The crane-type crawler then ascends the ramp from the trailer to the pallets located on the gondola railroad car to facilitate unloading the gondola railroad car by an electromagnet, bucket, grapples or other material-handling device. The crane-type crawler traverses the top of the gondola railroad car by repositioning the pallets from tile rear to the front of the crawler in sequence, to allow complete loading or unloading of the gondola railroad car. The pallets can also be placed over the space between coupled gondola railroad cars to facilitate continual traversal of a string of gondola railroad cars by tile crane-type crawler without requiring dismounting of the crawler from the top of the cars.

One of the problems which exists in the loading and unloading of railroad cars and open-top gondola railroad cars in particular, is the lack of facility for accessing the interior of the cars with lifting-devices such as cranes and other loading and unloading apparatus. Cargo such as scrap metal and tile like may be loaded and unloaded from gondola railroad cars using electromagnets mounted on the arms of cranes, but tile cranes must be properly positioned to access the interior of the gondola railroad cars without damaging the cars or the cranes.

2. Description of the Prior Art

Loading of railroad cars such as open-top gondola railroad cars has been achieved in the past by using cranes mounted on railroad flat cars, as described in the Pierce Pacific Catalog included in the Information Disclosure Statement filed with this application. Other techniques include loading cross-ties in one end of the gondola car and operating a crane-type crawler inside the gondola car on the cross-ties to effect the loading or unloading operation. U.S. Pat. No. 4,175,902, dated Nov. 27, 1979, to Herzog, et al, details an "Apparatus for Loading and Unloading Railroad Cars". The apparatus includes a mobile wheeled device for loading and unloading an open-top gondola railroad car using power-actuated front and rear boom structures. A front supported foot is engageable with the upper surfaces of the railroad car sidewalls and is connected to the free ends of a front boom structure and similarly engageable rear supported feet are connected to the ends of outrigger arms movable outwardly from the sides of the rear end of tile mobile apparatus. The rear boom structure includes an articulated material-engaging grapple for effecting the loading and unloading operations. U.S. Pat. No. 4,190,394, dated Feb. 26, 1980, also to Herzog, et al, details a "Method For Unloading and Loading Railroad Cars", which method utilizes the apparatus detailed in U.S. Pat. No. 4,175,902. Another "Method and Apparatus for Loading and Unloading Railroad Gondola Cars" is detailed in U.S. Pat. No. 4,723,886, dated Feb. 9, 1988, to Larry E. Frederking. The method and apparatus are designed for loading and unloading gondola railroad cars having spaced, parallel side walls with upper supporting surfaces. The apparatus includes a hydraulic excavator having a boom structure and material-engaging device mounted on two tracks, the two tracks being adjustable inwardly and outwardly from the base of the hydraulic excavator to vary the distance between the tracks. Each of the tracks has a lip connected thereto, which extends downwardly adjacent to the upper surface of the parallel side walls of the gondola railroad car to prevent the hydraulic excavator from falling from the car when the two tracks are resting on the side walls of the car. An "Apparatus For Loading and Unloading Railroad Gondola Cars" is detailed in U.S. Pat. No. 4,830,562, dated May 16, 1989, also to Larry E. Frederking. The patent details a hydraulic excavator provided with a boom structure and a material-engaging device rotatably mounted on two tracks for moving a hydraulic excavator from one location to another. Each of the two tracks has an inside set of rollers and an outside set of rollers for supporting the track over its entire width and an adjusting structure for moving the tracks inwardly and outwardly to vary tile distance between the tracks. A track support apparatus is also included for supporting the track connected to the adjusting structure and multiple arms are connected to the outside of each of the track support apparatus to prevent the hydraulic excavator from falling from the gondola car when the two tracks are resting on the upper surfaces of the car.

It is an object of this invention to provide new and improved apparatus for loading and unloading railroad cars and particularly, gondola-type railroad cars using a crane-type crawler, which apparatus includes a trailer-mounted ramp for positioning in close proximity to the gondola railroad car and at least two specially designed pallets located on top of the gondola railroad car to receive and support the crane-type crawler.

Another object of this invention is to provide an access and support apparatus for loading and unloading gondola railroad cars using a crane-type crawler, which apparatus includes a trailer-mounted ramp adapted for positioning adjacent to tile end of a gondola railroad car above the coupler and at least two fixed or adjustable pallets adapted for spanning the top of the sides of the gondola railroad car and supporting the crane-type crawler as tile crawler is unloaded from the trailer onto the ramp and then on the pallets, wherein the gondola railroad car is loaded or unloaded by the crawler as tile crawler successively traverses the pallets, moving each pallet in sequence from the rear to the front of the crane-type crawler.

Still another object of this invention is to provide new and improved fixed pallets for removably positioning on the top of a gondola railroad car and supporting a crane-type crawler and loading or unloading the gondola railroad car.

Still another object of the invention is to provide new and improved adjustable pallets for spanning the top width of a gondola railroad car in adjustable relationship to compensate for the bulging center section of the car and supporting a crane-type crawler for loading or unloading the car.

A still further object of this invention is to provide new and improved adjustable pallets for removably mounting on the top of a gondola railroad car and adjustably spanning the bulging sides of the railroad car and supporting a crane-type crawler for loading and unloading the railroad car, wherein the adjustment feature includes spaced-apart, downwardly-extending leg assemblies, each having an adjustable inner sleeve to compensate for the bulging of the gondola railroad car near the center thereof.

SUMMARY OF THE INVENTION

These and other objects of the invention are provided in a new and improved access and support apparatus for unloading gondola railroad cars, which apparatus includes a ramp mounted on a flatbed trailer for locating the ramp adjacent to a gondola railroad car above the car coupler and several pallets adapted for spanning the top of the gondola railroad car, to facilitate moving a crane-type crawler from the trailer up the ramp and onto the pallets, wherein the gondola railroad car may be loaded or unloaded by successively traversing the pallets pursuant to movement of each of the pallets in positional sequence from the rear to the front of the crane-type crawler. The pallets may be fixed or adjustable in design, the latter of which each include four downwardly-extending leg assemblies fitted with horizontally-adjustable inner sleeves for accommodating the bulging or irregular, non-parallel side configurations of the gondola railroad cars.

BRIEF DESCRIPTION OF THE DRAWING

The invention will be better understood by reference to the accompanying drawings, wherein:

FIG. 1 is a perspective view of a preferred adjustable pallet for spanning the width of a gondola railroad car;

FIG. 2 is a side view, partially in section, of one end of the adjustable pallet illustrated in FIG. 1;

FIG. 3 is a perspective view of one corner of an alternative preferred fixed pallet for spanning the width of the gondola railroad car;

FIG. 4 is a side sectional view of the fixed pallet illustrated in

FIG. 3;

FIG. 5 is a top view of the adjustable pallet illustrated in FIG. 1;

FIG. 6 is a side view of the adjustable pallet illustrated in FIGS. 1, 2 and 5;

FIG. 7 is a side view, partially in section, of the access and support apparatus adjacent to a gondola railroad car, which apparatus is positioned for loading or unloading the gondola railroad car;

FIG. 8 is a top view of the ramp element of the access and support apparatus illustrated in FIG. 7;

FIG. 9A is a side view of the access and support apparatus illustrated in FIG. 7, more particularly illustrating a crane-type crawler progressing from the ramp element to a pallet element of the access and support apparatus, which pallet spans the sides of an open-top gondola railroad car;

FIG. 9B is a side view, more particularly illustrating the progression of the crane-type crawler on pallets removably mounted on the tops of the gondola railroad car;

FIG. 9C is a side view of the gondola railroad car, crawler and pallets, more particularly illustrating a preferred first step in sequentially relocating the pallets one-by-one from the rear to the front of the crane-type crawler;

FIG. 9D is a side view of the gondola railroad car, crawler and pallets, more particularly illustrating a preferred second step in relocating the pallets, and;

FIG. 9E is a side view of the gondola railroad car, crawler and pallets, more particularly illustrating a preferred technique for spanning the spaces between gondola railroad cars using a pallet of this invention.

DESCRIPTION OF THE PREFERRED EMBODIMENTS

Referring initially to FIGS. 7 and 8 of the drawings, a primary element of the access and support apparatus of this invention includes a fixed pallet 1, spanning the gondola sides 56 of a gondola railroad car 55. The gondola railroad car 55 is characterized by train wheels 58, mounted on rails 59 and includes a coupler 60 on each end. Other elements of the access and support apparatus include a trailer 50 having a trailer bed 51, supported by wheels 52, upon which bed 51 is mounted a ramp 43. The ramp 43 is characterized by a horizontal ramp base 44, which is seated on the trailer bed 51 of the trailer 50 and tread supports 45 are mounted in spaced, inclined relationship on the ramp base 44 by means of multiple ramp braces 47. The tread supports 45 are further provided with spaced tread grip bars 46 for accommodating the tracks 64 of a crane-type crawler 62, illustrated in phantom in FIG. 7. A horizontal ramp overhang 48 extends from the inclined tread supports 45 and projects over the top of the gondola sides 56 of the gondola railroad car 55. Accordingly, it will be appreciated from a consideration of FIGS. 7 and 8 that the crane-type crawler 62 may be located on the trailer bed 51 of the trailer 50 along with the ramp 43 and operated to traverse the spaced tread supports 45 in the manner illustrated in phantom in FIG. 7, to access the top of the gondola railroad car 55. It will also be appreciated from a consideration of FIG. 7 that the crane-type crawler 62 may ascend the ramp 43 and use an electromagnet 66 (also illustrated in phantom) to position a fixed pallet 1 on the gondola sides 56 for accessing and loading or unloading the gondola railroad car 55, as further hereinafter described.

Referring now to FIGS. 1, 2, 5 and 6 of the drawings, in a preferred embodiment of the invention an adjustable pallet is generally illustrated by reference numeral 21. Like the fixed pallet 1 illustrated in FIG. 7, the adjustable pallet 21 is designed to span the gondola sides 56 of a gondola railroad car 55 and facilitate access by the crane-type crawler 62. The adjustable pallet 21 is characterized by a pair of spaced, parallel, box-beam spanning members 2, each fitted with an end bevel 3 and an inwardly-facing lifting lug 4, for handling the adjustable pallet 21. Reinforcing plates 5 may be provided on the extending ends of the spanning members 2 for strengthening spanning members 2, as further illustrated in FIG. 5. The spanning members 2 are maintained in parallel, spaced relationship by three cross-members 6, which, like the spanning members 2, are most preferably characterized by box-beam construction. End gussets 7 are provided between the end ones of the cross-members 6 and the corresponding spanning members 2 for strengthening purposes. Similarly, channel-shaped cross-braces 9 span the distance between the respective spanning members 2 forward, or outside of the end ones of the cross-members 6 and may be welded at the ends to the end gussets 7, to further stiffen the adjustable pallet 21, as is more particularly illustrated in FIG. 1. Each of the cross-braces 9 is characterized by a top cross-brace web 10 and a bottom cross-brace web 11, projecting in spaced, parallel relationship from a vertical center plate 12, as further illustrated in FIG. 1. A flat deck plate 13 is located on the top surfaces of the spanning members 2, cross-members 6 and the top cross-brace web 10 of the cross-braces 9, respectively, where the deck plate 13 is welded into position, as further illustrated in FIGS. 1, 2, 5 and 6. The deck plate 13 is characterized by end margins 14, which terminate at the top cross-brace web 10 of each of the cross-braces 9, respectively, and side margins 15, which parallel the outside edges of the top surface of the two spanning members 2. The deck plate 13 is welded to the top cross-brace web 10 of each of the cross braces 9, respectively, as well as the spanning members 2, according to techniques well known to those skilled in the art. A pair of upward-standing guides 17 are provided in spaced, parallel relationship on the deck plate 13 for guiding the tracks 64 of the crane-type crawler 62, as further hereinafter described. Each of the guides 17 is characterized by an upward-standing guide plate 17a, the bottom edge of which is welded or otherwise secured to the deck plate 13 and an inwardly-projecting top guide web 18, welded or otherwise secured to the top edge of the guide plate 17a, with guide gussets 19 provided in spaced relationship between the top guide web 18 and the guide plate 17a, for stiffening and support purposes. Like the guide plate 17a, the bottom edges of the guide gussets 19 are welded or otherwise rigidly secured to the deck plate 13. A web radius 20 is shaped in oppositely-disposed, facing relationship in the top guide webs 18 to facilitate insertion of the electromagnet 66 between the guides 17 and against the deck plate 13 for lifting and handling the adjustable pallet 21, as hereinafter further described. A leg assembly 23 projects downwardly from each corner of the adjustable pallet 21, as further illustrated in FIGS. 1, 2, 5 and 6. Each leg assembly 23 is further characterized by parallel, vertically-spaced legs 24, each fitted with a leg bevel 25 at the top thereof and joined at the bottom by a horizontal outer sleeve 27. The outer sleeve 27 is further provided with an outer sleeve end plate 28 and a stiffener angle 29, to increase the structural integrity of the outer sleeve 27. In a preferred embodiment of the invention, each outer sleeve 27 is characterized by a box beam type construction, with outer sleeve walls 30 of selected thickness. The outer sleeves 27 each accommodate a horizontal inner sleeve 32 in sliding relationship, as illustrated in FIGS. 1 and 2. Each inner sleeve 32 is further characterized by an inner sleeve end plate 33 and inner sleeve walls 34 of selected thickness and inner sleeve pin openings 35 are located in spaced, aligned relationship in the top and bottom inner sleeve walls 34. The inner sleeve pin openings 35 are designed to selectively register with corresponding outer sleeve openings 31, provided in the top and bottom outer sleeve walls 30, to facilitate insertion of the respective sleeve pins 37 vertically in the outer sleeve openings 31 and the corresponding inner sleeve pin openings 35, and horizontal adjustment of the inner sleeve 32 with respect to the outer sleeves 27, as illustrated in FIG. 2. In a preferred embodiment, each of the sleeve pins 37 includes a curved pin grip 38 and a pin plate 39 is welded or otherwise secured to the top outer sleeve wall 30 and is also provided with spaced openings (not illustrated) to accommodate the respective sleeve pins 37. As further illustrated in FIG. 2 of the drawings, the inner sleeve 32 is slidably horizontally adjustable with respect to the outer sleeve 27, in order to position the inner sleeve end plates 33 against the gondola sides 56 of the gondola railroad car 55. This adjustment feature is useful, since the gondola sides 56 of the gondola railroad car 55 frequently bulge outwardly near the center due to wear and use, and the adjustment feature is useful to minimize transverse slippage of the adjustable pallet 21 upon linear traversal of the gondola railroad car 55 by the crane-type crawler 62 in the manner hereinafter further described.

Referring now to FIGS. 3 and 4 of the drawings, it will be appreciated by those skilled in the art that the fixed pallet 1 is identical to the adjustable pallet 21 except for ommission of the four leg assemblies 23. Accordingly, the fixed pallet 1 can be utilized to span the gondola sides 56 of a gondola railroad car 55 in the manner illustrated in FIG. 7, without the adjustment feature offered by the leg assemblies 23.

In operation, and referring now to FIGS. 7 and 9A-9E of the drawings, the trailer-mounted ramp and pallet elements of the access and support apparatus of this invention are utilized to load or unload a gondola railroad car 55 as follows. Referring initially to FIGS. 7 and 9A, a crane-type crawler 62 is initially located on the trailer bed 51 of a trailer 50, along with the ramp 43, as hereinafter described. The ramp 43 is most preferably positioned in close proximity to one end of the gondola railroad car 55, with the ramp overhang 48 projecting above the coupler 60, as illustrated in FIG. 7. It will be appreciated that the top surface of the ramp overhang 48 is slightly above the top surface of the gondola sides 56 when the ramp 43 is in functional position, as illustrated in FIG. 7. The crane-type crawler 62, illustrated in phantom in FIG. 7, is then caused to move from a horizontal position on the trailer bed 51 adjacent to the ramp 43, upwardly along the parallel tread supports 45 of the ramp 43, such that the crane arm 65, illustrated in FIG. 9A, is able to reach a fixed pallet 1 or an adjustable pallet 21, located on the ground or also on the trailer bed 51. The crane arm 65 is fitted with an electromagnet 66 in conventional fashion and is operated to engage the deck plate 13 of the fixed pallet 1 (or an adjustable pallet 21) illustrated in FIGS. 1-4 and lift the fixed pallet 1 or adjustable pallet 21 to the position illustrated in FIG. 7, spanning the gondola sides 56. The crane-type crawler 62 is then advanced further upwardly on the tread supports 45 of the ramp 43, with the tread grip bars 46 serving to provide safe traction for the tracks 64, until the crane-type crawler 62 is in the relative position illustrated in FIG. 9A. The crane arm 65 and electromagnet 66 are then manipulated by an operator in the cab 63 to place a second fixed pallet 1 or adjustable pallet 21 forwardly of the first fixed pallet 1 or adjustable pallet 21 on the gondola sides 56 of the gondola railroad car 55, to facilitate advancement of the crane-type crawler 62 still farther along the top of the gondola sides 56. The crane arm 65 can then be operated along with electromagnet 66, to unload the ferrous metal cargo 57, located in the gondola railroad car 55, in conventional fashion, as illustrated in FIG. 9A.

As illustrated in FIG. 9B, when the ferrous metal cargo 57 has been unloaded from the accessed end of the gondola railroad car 55, the crane-type crawler 62 is operated to place an additional fixed pallet 1 forwardly of the second and third fixed pallet 1 illustrated in FIG. 9B, to continue along the gondola sides 56. As illustrated in FIGS. 9C and 9D, each rearwardly positioned fixed pallet 1 (or adjustable pallet 21) can be successively moved by operation of the crane arm 65 and the electromagnet 66 to the forward position, to facilitate continued progress of the crane-type crawler 62 along the gondola car sides 56. This procedure allows progressive operation of the crane-type crawler 62 to unload the ferrous metal cargo 57 sequentially and successively along the entire length of the gondola railroad car 55. As further illustrated in FIG. 9E, an additional fixed pallet 1 or adjustable pallet 21 can be utilized to span the distance between successive coupled gondola railroad cars 55, to continue the progress of the crane-type crawler 62 along the entire length of a string of coupled gondola railroad cars 55 for unloading the ferrous metal cargo 57.

Unloading the crane-type crawler 62 from the elevated position on the gondola railroad cars 55 is achieved by a reversal of the loading process, with the crane-type crawler 62 exiting the last one of the fixed pallets 1 or adjustable pallets 21 on the end of the last gondola railroad car 55 to be unloaded, onto the ramp 43, which is positioned adjacent to this last gondola railroad car 55 by operation of the trailer 50. Accordingly, the crane-type crawler 62 proceeds down the inclined tread supports 45 onto the horizontal portion of the trailer bed 51, where it and the ramp 43 are ready for transportation to another location and loading and-/or unloading additional gondola railroad cars 55.

It will be appreciated by those skilled in the art that loading and unloading of the crane-type crawler 62 onto and from the gondola railroad cars 55 and handling of cargo can be equally well achieved by using either the fixed pallets 1 or the adjustable pallets 21, or a combination of both. However, referring again to FIGS. 1, 2 and 9A–9E, the adjustable pallet 21 is most frequently utilized to span the gondola sides 56 of the gondola railroad car 55 under circumstances where the gondola sides 56 bulge outwardly or are otherwise irregular and non-parallel due to age and extended use. Under these circumstances, and referring again to FIGS. 1 and 2, the respective sleeve pins 37 may be removed from the outer sleeve openings 31, located in the outer sleeve 27, and the aligned inner sleeve pin openings 35 provided the inner sleeve 32. The inner sleeves 32 may then be extended with respect to the outer sleeves 27 to fit the respective inner sleeve end plates 33 against the inside surfaces of the irregular gondola sides 56 and the sleeve pins 37 again inserted in the outer sleeve openings 31 and the newly registering inner sleeve pin openings 35, as illustrated in FIG. 2. This procedure prevents the adjustable pallets 21 from sliding laterally when traversed by the crane-type crawler 62 and increases the safety factor when utilizing the crane-type crawler 60 on the tops of the gondola sides 56. This adjustment may be made further outwardly and again inwardly, as each successive adjustable pallet 21 is deployed on the gondola sides 56, depending upon the extent of deviation of the gondola sides 56 from the normal parallel configuration.

It will be appreciated by those skilled in the art that the access and support apparatus of this invention is characterized by convenience and utility, in that a string of gondola railroad cars 55 of substantially any length can be quickly and easily loaded or unloaded using a conventional crane-type crawler loaded on a flatbed or "low boy" trailer 50, along with a corresponding ramp 43. Furthermore, the ramp 43 may be either permanently fixed to the trailer bed 51 or removably mounted, in order to prevent the crane-type crawler 62 from causing unsafe movement of the ramp 43 with respect to time trailer bed 51 during the loading or unloading operation. Moreover, as heretofore described, either the fixed pallet 1 or the adjustable pallet 21 may be utilized to support the crane-type crawler 62 on the gondola sides 56 of the gondola railroad car 55, depending upon extent of "bulge" or distortion in the gondola sides 56 of the particular gondola railroad cars 55 being loaded or unloaded. For example, under circumstances where the gondola railroad cars 55 are new and in fairly good condition and are therefore characterized by substantially parallel gondola sides 56, the fixed pallet 1 may be safely utilized. Alternatively, under circumstances where the gondola car 55 are older and are characterized by significant bulging of the gondola sides 56 near the centers thereof or other irregularities, the adjustable pallets 21 are safer for this service.

It will be further appreciated by those skilled in the art that substantially any crane-type crawler fitted with tracks 64 may be utilized in the access and support apparatus of this invention to load and unload gondola railroad cars. It will be further appreciated that these crane-type crawlers nay be fitted with grapple hooks, buckets or other conventional unloading members rather than the electromagnet 66, depending upon the character of the cargo 57 to be loaded or unloaded. Moreover, while metal such as steel or aluminum is a preferred material of construction, other materials such as wood, fiberglass and the like, in non-exclusive particular can also be used without departing from the spirit and scope of the invention.

While the preferred embodiments of the invention have been described above, it will be recognized and understood that various modifications may be made in the invention and the appended claims are intended to cover all such modifications which may fall within the spirit and scope of the invention.

Having described our invention with the particularity set forth above, what is claimed is:

1. In an open top gondola railroad car and a crane-type crawler having parallel tracks and an electromagnet for unloading the open top gondola railroad car, the improvement comprising fixed pallet for positioning on the top edges of upwardly-extending sides defining the open top of the gondola railroad car and supporting the crane-type crawler, said fixed pallet comprising a frame characterized by a pair of spaced spanning members, at least two-cross members connecting said spanning members in spaced relationship and a flat top plate spanning said frame substantially equidistant from the ends of said spanning members, for supporting the crane-type crawler, a pair of guides upward-standing from said top plate in spaced relationship for guiding the tracks of the crane-type crawler over said fixed pallet and a web radius provided in said guides for accommodating said electromagnet.

2. The fixed pallet of claim 1 further comprising a pair of channel-shaped cross-braces connecting said spanning members in spaced relationship, for stiffening said frame.

3. The fixed pallet of claim 2 further comprising end gussets connecting said spanning members and said cross-members, respectfully, for further stiffening said frame.

4. The fixed pallet of claim 3 further comprising lifting lugs provided on said spanning members for lifting and handling said fixed pallet.

* * * * *